United States Patent
Ueyama

(10) Patent No.: US 11,746,169 B2
(45) Date of Patent: Sep. 5, 2023

(54) POLYMER COMPOSITION AND ION-EXCHANGE MEMBRANE

(71) Applicant: ASAHI KASEI KABUSHIKI KAISHA, Tokyo (JP)

(72) Inventor: Hiroyuki Ueyama, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 232 days.

(21) Appl. No.: 17/367,765

(22) Filed: Jul. 6, 2021

(65) Prior Publication Data

US 2022/0010047 A1    Jan. 13, 2022

(30) Foreign Application Priority Data

Jul. 6, 2020  (JP) .................................. 2020-116291
Jul. 2, 2021  (JP) .................................. 2021-110455

(51) Int. Cl.
  *C08F 214/18*  (2006.01)
  *C08L 27/22*   (2006.01)
  *C08J 5/22*    (2006.01)
  *C08F 2/22*    (2006.01)

(52) U.S. Cl.
  CPC ............ *C08F 214/184* (2013.01); *C08F 2/22* (2013.01); *C08J 5/2237* (2013.01); *C08L 27/22* (2013.01)

(58) Field of Classification Search
  CPC ........ C08F 214/184; C08F 2/22; C08L 27/22; C08J 5/2257
  USPC .......................................................... 521/27
  See application file for complete search history.

(56) References Cited

U.S. PATENT DOCUMENTS

| | | | | |
|---|---|---|---|---|
| 4,320,205 A | * | 3/1982 | Asawa | C08F 214/184 521/38 |
| 5,182,342 A | * | 1/1993 | Feiring | C08F 16/24 526/206 |
| 8,394,865 B2 | * | 3/2013 | Umemura | B32B 5/022 429/492 |
| 2009/0306233 A1 | * | 12/2009 | Umemura | C08J 5/2237 521/27 |
| 2010/0093878 A1 | * | 4/2010 | Yang | H01M 8/1072 521/27 |
| 2011/0015283 A1 | | 1/2011 | Tomita et al. | |
| 2011/0101503 A1 | | 5/2011 | Uno et al. | |

(Continued)

FOREIGN PATENT DOCUMENTS

| CN | 102015776 A | 4/2011 |
|---|---|---|
| CN | 103619890 A | 3/2014 |

(Continued)

*Primary Examiner* — Michael M. Bernshteyn
(74) *Attorney, Agent, or Firm* — GREENBLUM & BERNSTEIN, P.L.C.

(57) ABSTRACT

Provided are a polymer composition that can suppress bubbling during membrane formation and peeling of a laminated membrane and an ion-exchange membrane. The polymer composition is a polymer composition including: a fluorine-containing copolymer including a unit (a) derived from a perfluorovinyl compound having a side chain having an ionic group and a unit (b) derived from a fluoroolefin; and a low molecular weight compound (a) having a functional group represented by —COOX (X is H, $NH_4$, or a monovalent metal ion), wherein a content of the low molecular weight compound (a) is 600 ppm or less based on a mass of the polymer composition.

7 Claims, 1 Drawing Sheet

(56) References Cited

U.S. PATENT DOCUMENTS

| | | | |
|---|---|---|---|
| 2014/0073709 A1 | 3/2014 | Hattori et al. | |
| 2014/0088278 A1* | 3/2014 | Abe .................... | C08F 214/26 |
| | | | 526/245 |
| 2014/0100344 A1 | 4/2014 | Aida et al. | |
| 2014/0155564 A1 | 6/2014 | Oikawa et al. | |
| 2015/0141604 A1 | 5/2015 | Sugiyama et al. | |
| 2020/0199259 A1 | 6/2020 | Chen et al. | |

FOREIGN PATENT DOCUMENTS

| | | |
|---|---|---|
| CN | 104583253 A | 4/2015 |
| JP | H07-504224 | 5/1995 |
| JP | 2008-179770 | 8/2008 |
| JP | 2013-529716 | 7/2013 |
| JP | 2014-109022 | 6/2014 |
| WO | 2012/000851 | 1/2012 |
| WO | 2012/157714 | 11/2012 |
| WO | 2019/055791 | 3/2019 |

* cited by examiner

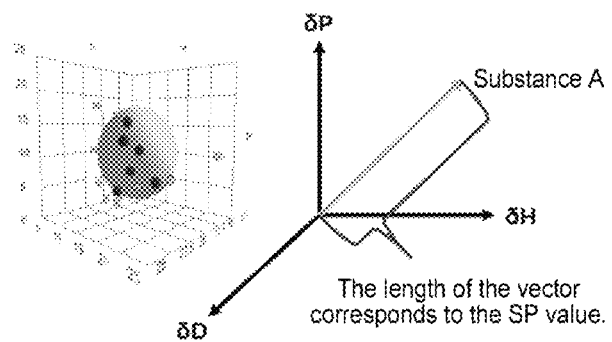

POLYMER COMPOSITION AND ION-EXCHANGE MEMBRANE

TECHNICAL FIELD

The present invention relates to a polymer composition and an ion-exchange membrane.

BACKGROUND ART

Examples of various electrochemical apparatuses using an ion-exchange membrane as an electrolyte include an alkali metal salt electrolyzer, a water electrolyzer, a hydrochloric acid electrolyzer, and a fuel cell. Among them, one that has matured as an industrial process and is widely used is electrolysis using an alkali metal salt electrolyzer. Conventionally, an industrial method for producing a halogen gas such as chlorine, a caustic alkali, and hydrogen by electrolyzing an aqueous solution of an alkali metal salt, particularly sodium chloride, potassium chloride, or the like, is well known. Among such methods, an ion-exchange membrane method electrolysis technology using an ion-exchange membrane as a membrane has been industrialized worldwide as the most advantageous process for the least power consumption and energy saving.

As the ion-exchange membrane used in an alkali chloride electrolysis method for producing an alkali hydroxide and chlorine by electrolyzing an alkali chloride aqueous solution such as seawater, a membrane composed of a fluorine-containing copolymer having a carboxylic acid type functional group or a sulfonic acid type functional group is known. The fluorine-containing copolymer is obtained by copolymerizing a fluorine-containing monomer having a carboxylic acid type functional group or a sulfonic acid type functional group with a fluorine-containing olefin.

Examples of the polymerization method include an emulsion polymerization method, a solution polymerization method, a suspension polymerization method, and a bulk polymerization method. In these polymerization methods, a low molecular weight polymer (oligomer) having a low molecular weight remains in the polymer. In order to reduce such an oligomer, it is known to clean a fluorine-containing copolymer as a method for reducing the low molecular weight polymer included in the fluorine-containing copolymer (Patent Literatures 1 and 2).

CITATION LIST

Patent Literature

[Patent Literature 1] International Publication No. WO 2012/157714
[Patent Literature 2] International Publication No. WO 2012/000851

SUMMARY OF INVENTION

Technical Problem

In both Patent Literatures 1 and 2, it has not been sufficiently studied particularly which oligomer should be cleaned and how much cleaning should be carried out. Specifically, the insufficiency is as follows.

The method disclosed in Patent Literature 1 carries out the cleaning only with a fluorine-based solvent, and thus has the following problems: the loss of the polymer itself is large, causing reduction in the yield, and the polymer is partially gelled and the filterability becomes very poor, causing reduction in the productivity. As a result, according to the method disclosed in Patent Literature 1, it is difficult to sufficiently reduce the amount of an oligomer accompanying the desired polymer. In addition, for the polymer disclosed in Patent Literature 2, in order to clean the polymer obtained by emulsion polymerization with a fluorine-based solvent, it is necessary to dry the polymer once after washing with water and pelletize it, and this is not only troublesome and costly but also makes it difficult to sufficiently reduce the amount of an oligomer.

Studies by the present inventors have been found that if a fluorine-containing copolymer is accompanied by a specific low molecular weight compound, bubbling occurs when the fluorine-containing copolymer is heated to form a membrane, or peeling occurs at the interface when a membrane of the fluorine-containing copolymer is laminated with another membrane or at the time of electrolysis. It has also been found that when the low molecular weight compound has an ionic group, it is colored by thermal decomposition during melt molding and further bubbling is caused by moisture in the hygroscopic air.

The present invention has been made in view of the problems of the prior art described above, and an object of the present invention is to provide a polymer composition that can suppress bubbling during membrane formation and peeling of a laminated membrane and an ion-exchange membrane.

Solution to Problem

As a result of diligent research to solve the problems described above, the present inventors have found that the problems described above can be solved by sufficiently reducing the content of a specific low molecular weight compound in a polymer composition including a fluorine-containing copolymer and have completed the present invention.

That is, the present invention includes the following aspects.

[1]
A polymer composition comprising:
a fluorine-containing copolymer comprising a unit (a) derived from a perfluorovinyl compound having a side chain having an ionic group and a unit (b) derived from a fluoroolefin; and
a low molecular weight compound (a) having a functional group represented by -COOX (X is H, NH4, or a monovalent metal ion),
wherein a content of the low molecular weight compound (a) is 600 ppm or less based on a mass of the polymer composition.

[2]
The polymer composition according to [1], wherein the polymer composition further comprises a low molecular weight compound (b) that does not have a functional group represented by —COOX (X is H, NH$_4$, or a monovalent metal ion),
wherein a content of the low molecular weight compound (b) is 50 ppm or less based on the mass of the polymer composition.

[3]
The polymer composition according to [1] or [2],
wherein the content of the low molecular weight compound (a) is 20 to 300 ppm.

[4]

The polymer composition according to any of [1] to [3], wherein a number average molecular weight of the low molecular weight compound (a) is 300 to 4000.

[5]

The polymer composition according to any of [1] to [4], wherein the perfluorovinyl compound is represented by the following formula (I):

$$CF_2=CF-(OCF_2CYF)_a-O-(CF_2)_b-SO_2M \quad (I)$$

wherein a represents an integer of 0 to 2, b represents an integer of 1 to 4, Y represents —F or —CF$_3$, and M represents —F or —Cl.

[6]

A method for producing the polymer composition according to any of [1] to [5], comprising a step of emulsion-polymerizing the fluoroolefin and the perfluorovinyl compound to obtain the fluorine-containing copolymer.

[7]

An ion-exchange membrane comprising the polymer composition according to any of [1] to [5].

Advantageous Effect of Invention

According to the present invention, a polymer composition that can suppress bubbling during membrane formation and peeling of a laminated membrane and an ion-exchange membrane can be obtained.

BRIEF DESCRIPTION OF DRAWING

The drawing Figure shows an explanatory diagram illustrating three-dimensional spatial coordinates of an HSP value.

DESCRIPTION OF EMBODIMENT

Hereinafter, a mode for carrying out the present invention (hereinafter, also referred to as "the present embodiment") will be described in detail. The present invention is not limited to the present embodiment below, and can be variously modified and carried out within the scope of the gist thereof.

The definitions of the following terms apply throughout the present description and the claims.

The monomer means a compound having a polymerization-reactive carbon-carbon double bond.

The ionic group means an ionic functional group itself or a functional group that can be converted into a sulfonic acid or a carboxylic acid by hydrolysis or neutralization.

The sulfonic acid type functional group means a sulfonic acid group (—SO$_3$H) itself or a functional group that can be converted into a sulfonic acid group by hydrolysis or neutralization.

The carboxylic acid type functional group means a carboxyl group (—COOH) itself or a functional group that can be converted into a carboxyl group by hydrolysis or neutralization.

The low molecular weight compound means a so-called oligomer in which the number of monomer units constituting the polymer is relatively small (the degree of polymerization is relatively small). The low molecular weight compound is a component that affects the properties of the obtained fluorine-containing copolymer, and the molecular weight (degree of polymerization) thereof varies depending on the use (required properties) of the fluorine-containing copolymer.

<Polymer Composition>

The polymer composition of the present embodiment is a polymer composition including: a fluorine-containing copolymer including a unit (a) derived from a perfluorovinyl compound having a side chain having an ionic group and a unit (b) derived from a fluoroolefin; and a low molecular weight compound (a) having a functional group represented by —COOX (X is H, NH$_4$, or a monovalent metal ion), wherein the content of the low molecular weight compound (a) is 600 ppm or less based on the mass of the polymer composition. The polymer composition of the present embodiment is configured as described above, and thus can suppress bubbling during membrane formation and peeling of a laminated membrane. The polymer composition of the present embodiment is configured as described above, and thus can also be expected to suppress coloring during membrane formation.

(Fluorine-Containing Copolymer)

The polymer composition of the present embodiment includes a fluorine-containing copolymer as a main component thereof. The fluorine-containing copolymer in the present embodiment includes a unit (a) derived from a perfluorovinyl compound having a side chain having an ionic group and a unit (b) derived from a fluoroolefin.

(Unit (a))

The unit (a) is derived from a perfluorovinyl compound having a side chain having an ionic group. Examples of the perfluorovinyl compound include one having a sulfonic acid type functional group and one having a carboxylic acid type functional group.

The perfluorovinyl compound having a sulfonic acid type functional group (hereinafter, also referred to as "compound (m1)") is not particularly limited as long as it is a vinyl monomer having one or more fluorine atoms in the molecule and having a sulfonic acid type functional group, and a conventionally known compound can be used.

Here, the sulfonic acid type functional group is a sulfonic acid group (—SO$_3$H) itself or a functional group that can be converted into a sulfonic acid group by hydrolysis or neutralization.

Examples of the functional group that can be converted into a sulfonic acid group include —SO$_3$M (wherein M is an alkali metal or a quaternary ammonium base), —SO$_2$F, —SO$_2$Cl, and —SO$_2$Br.

Compound (m1) is preferably compound (m2) or compound (m3) in that it is excellent in the production cost of the monomer, the reactivity with a further monomer, and the properties of the obtained fluorine-containing copolymer.

$$CF_2=CF-O-R^{f2}\text{-}A^2 \quad (m2),$$

$$CF_2=CF-R^{f2}\text{-}A^2 \quad (m3).$$

$R^{f2}$ is a perfluoroalkylene group having 1 to 20 carbon atoms, may include an ethereal oxygen atom, and may be linear or branched.

$A^2$ is a sulfonic acid type functional group.

As compound (m2), specifically, the following compounds are preferable.

$$CF_2=CF-O-(CF_2)_{1-8}-SO_2F,$$

$$CF_2=CF-O-CF_2CF(CF_3)O(CF_2)_{1-8}-SO_2F,$$

$$CF_2=CF[OCF_2CF(CF_3)]_{1-5}SO_2F.$$

As compound (m3), specifically, the following compounds are preferable.

$CF_2=CF(CF_2)_{0-8}-SO_2F$, $CF_2=CF-CF_2-O-(CF_2)_{1-8}-SO_2F$.

As the perfluorovinyl compound having a sulfonic acid type functional group, the following compounds are more preferable from the viewpoint of easy industrial synthesis.

$CF_2=CFOCF_2CF_2SO_2F$, $CF_2=CFOCF_2CF_2CF_2SO_2F$, $CF_2=CFOCF_2CF_2CF_2CF_2SO_2F$, $CF_2=CFOCF_2CF(CF_3)OCF_2CF_2SO_2F$, $CF_2=CFOCF_2CF(CF_3)OCF_2CF_2CF_2SO_2F$, $CF_2=CFOCF_2CF(CF_3)SO_2F$, $CF_2=CFCF_2CF_2SO_2F$, $CF_2=CFCF_2CF_2CF_2SO_2F$, $CF_2=CFCF_2CF_2CF_2CF_2SO_2F$, $CF_2=CF-CF_2-O-CF_2CF_2-SO_2F$.

In the present embodiment, the perfluorovinyl compound having a sulfonic acid type functional group is preferably a perfluorovinyl ether represented by the following formula (I), and more preferably M is F in the formula (I).

$$CF_2=CF-(OCF_2CYF)_a-O-(CF_2)_b-SO_2M \quad (I)$$

wherein a represents an integer of 0 to 2, b represents an integer of 1 to 4, Y represents —F or —$CF_3$, and M represents —F or —Cl.

As the perfluorovinyl compound in the present embodiment, the compounds described above may be used singly or in combinations of two or more thereof.

The perfluorovinyl compound having a carboxylic acid type functional group is not particularly limited as long as it is a perfluorovinyl compound monomer having one or more fluorine atoms in the molecule and having a carboxylic acid type functional group, and a conventionally known compound can be used.

As the perfluorovinyl compound having a carboxylic acid type functional group, a perfluorovinyl compound represented by the following formula (1) is preferable from the viewpoint of industrial productivity.

$$CF_2=CF-(O)_p-(CF_2)_q-(CF_2CFX)_r-(O)_s-(CF_2)_t-(CF_2CFX')_u-A \quad (1)$$

p is 0 or 1, q is 0 or 1, r is an integer of 0 to 3, s is 0 or 1, t is an integer of 0 to 12, and u is an integer of 0 to 3. However, r and u cannot be 0 at the same time. That is, $1 \leq r+u$.

X is a fluorine atom or a trifluoromethyl group. X' is a fluorine atom or a trifluoromethyl group. If both X and X' are present in one molecule, these may be the same or different.

A is a carboxylic acid type functional group. The carboxylic acid type functional group refers to a carboxylic acid group (—COOH) itself or a functional group that can be converted into a carboxylic acid group by hydrolysis or neutralization. Examples of the functional group that can be converted into a carboxylic acid group include —CN, —COF, —COOR$^1$ (wherein R$^1$ is an alkyl group having 1 to 10 carbon atoms), —COOM (wherein M is an alkali metal or a quaternary ammonium base), and —COONR$^2$R$^3$ (wherein R$^2$ and R$^3$ are each a hydrogen atom or an alkyl group having 1 to 10 carbon atoms, and R$^2$ and R$^3$ may be the same or different).

p is 0 or 1, q is an integer of 0 to 12, r is an integer of 0 to 3, s is 0 or 1, t is an integer of 0 to 12, and u is an integer of 0 to 3. However, p and s cannot be 0 at the same time, and r and u cannot be 0 at the same time. That is, $1 \leq p+s$ and $1 \leq r+u$.

Specific examples of the perfluorovinyl compound represented by the formula (1) include the following compounds, and from the viewpoint of easy production, a compound wherein p=1, q=0, r=1, s=0 to 1, t=1 to 3, and u=0 to 1 is preferable.

$CF_2=CF-O-CF_2CF_2-COOCH_3$, $CF_2=CF-O-CF_2CF_2-CF_2-COOCH_3$, $CF_2=CF-O-CF_2CF_2-CF_2CF_2-COOCH_3$, $CF_2=CF-O-CF_2CF_2-O-CF_2CF_2-COOCH_3$, $CF_2=CF-O-CF_2CF_2-O-CF_2CF_2-CF_2-COOCH_3$, $CF_2=CF-O-CF_2CF_2-O-CF_2CF_2-CF_2CF_2-COOCH_3$, $CF_2=CF-O-CF_2-CF_2CF_2-O-CF_2CF_2-COOCH_3$, $CF_2=CF-O-CF_2CF(CF_3)-O-CF_2CF_2-COOCH_3$, $CF_2=CF-O-CF_2CF(CF_3)-O-CF_2-CF_2CF_2-COOCH_3$ (Unit (b))

The unit (b) is derived from a fluoroolefin. As the fluoroolefin, an olefin having one or more fluorine atoms in the molecule and having 2 to 3 carbon atoms is used. Specific examples of the fluoroolefin include tetrafluoroethylene ($CF_2=CF_2$; hereinafter, also referred to as "TFE"), chlorotrifluoroethylene ($CF_2=CFCl$), vinylidene fluoride ($CF_2=CH_2$), and vinyl fluoride ($CH_2=CHF$), and hexafluoropropylene ($CF_2=CFCF_3$). TFE is particularly preferable in that it is excellent in the production cost of the monomer, the reactivity with a further monomer, and the properties of the obtained fluorine-containing copolymer. The fluoroolefins may be used singly or in combinations of two or more thereof.

(Further Monomer)

In the present embodiment, in addition to the perfluorovinyl compound and fluoroolefin described above, a further monomer may be copolymerized. The further monomer corresponds to neither of a perfluorovinyl compound and a fluoroolefin, and examples thereof include $CF_2=CF-R^f$ (wherein Rf is a perfluoroalkyl group having 1 to 10 carbon atoms containing an ethereal oxygen atom in the middle), $CF_2=CF-OR^{f1}$ (wherein R$^{f1}$ is a perfluoroalkyl group having 1 to 10 carbon atoms and may contain an ethereal oxygen atom in the middle), and $CF_2=CFO(CF_2)_vCF=CF_2$ (wherein v is an integer of 1 to 3). By copolymerizing a further monomer, the flexibility and mechanical strength of the ion-exchange membrane can be improved. The proportion of the further monomer is preferably 30% by mass or less, and more preferably 1 to 20% by mass, based on all the monomers (100% by mass) from the viewpoint of maintaining the ion exchange performance.

The polymer composition of the present embodiment includes a low molecular weight compound (a) having a functional group represented by —COOX (X is H, NH$_4$, or a monovalent metal ion), wherein the content of the low molecular weight compound is 600 ppm or less based on the mass of the polymer composition. When the content is 600 ppm or less, bubbling during membrane formation and peeling of a laminated membrane can be suppressed. From the same viewpoint, the content is preferably 500 ppm or less, and more preferably 300 ppm or less. In addition, the lower limit of the content is not particularly limited, and may be, for example, about 1 ppm. In the present embodiment, the content is preferably 20 ppm or more from the viewpoint of improving the adhesiveness of the laminated membrane. The content can be measured by the method described in Examples described later. In addition, the content can be adjusted to be in the above range by adopting a preferable production method described later or the like.

(Low Molecular Weight Compound (a))

The low molecular weight compound (a) is a compound having a —COOX group (X is H, NH$_4$, or a monovalent metal ion) at least one end of the main chain, and has a structure represented by the following (A), formula (B), or the like. The following formula (A) has a main chain structure consisting only of a TFE unit, and the following formula (B) is a copolymerized oligomer of a sulfonic acid type monomer unit and a TFE unit.

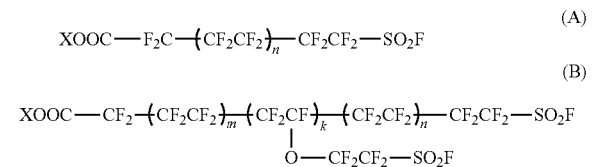

In the case of a copolymer of CF$_2$=CFOCF$_2$CF$_2$SO$_2$F and TFE, the two oligomers described above and the like can be produced (integers m and n≥0 and k≥1). In addition, each —SO$_2$F group may be partially hydrolyzed to be —SO$_3$M (M is H, NH$_4$, or a monovalent metal ion).

The low molecular weight compound (a) has a structure that easily adsorbs water, derived from an ionic group thereof, and is easily decarboxylated, and thus affects bubbling during melt molding.

(Low Molecular Weight Compound (b))

The polymer composition of the present embodiment can further include a low molecular weight compound (b) that does not have a functional group represented by —COOX (X is H, NH$_4$, or a monovalent metal ion). That is, the low molecular weight compound (b) is a low molecular weight compound that does not have a carboxyl group at any end of the main chain. In the present embodiment, from the viewpoint of preventing peeling of the laminated membrane during electrolysis (a phenomenon called so-called delamination) and preventing deterioration in electrolysis performance, the content of the low molecular weight compound (b) is preferably 50 ppm or less based on the mass of the polymer composition. The content can be measured by the method described in Examples described later. In addition, the content can be adjusted to be in the above range by adopting a preferable production method described later or the like.

Regarding the low molecular weight compound (a), it is considered that almost no compound having a molecular weight of 300 or less is generated because of the generation mechanism (molecular structure). A low molecular weight oligomer having a molecular weight of 4,000 or less undergoes a main chain cleavage/decomposition reaction or the like during heating, and is more likely to volatilize as the molecular weight is further reduced, which has a large influence on bubbling and coloring during melt molding, and thus the number average molecular weight of low molecular weight compound (a) is preferably 300 or more and 4,000 or less, and more preferably 300 or more and 2,000 or less. The number average molecular weight can be measured by the method described in Examples described later. In addition, the number average molecular weight can be adjusted to be in the above range by adopting a preferable production method described later or the like.

The number average molecular weight of the low molecular weight compound (b) is not particularly limited, and is preferably 2,000 or more and 8,000 or less. The number average molecular weight can be measured by the same method as that of the low molecular weight compound (a). In addition, the number average molecular weight can be adjusted to be in the above range by adopting a preferable production method described later or the like.

<Method for Producing Polymer Composition>

Examples of a method for producing the polymer composition of the present embodiment (hereinafter, also referred to as "the production method of the present embodiment") include a method including a step of polymerizing the fluoroolefin and the perfluorovinyl compound to obtain the fluorine-containing copolymer. Examples of the polymerization method include a bulk polymerization method, a solution polymerization method, an emulsion polymerization method, and a suspension polymerization method, and emulsion polymerization is preferable in that the volume efficiency of the polymerization tank is high, the heat removal during polymerization and the torque during stirring are low, and fluorine-containing copolymers having a wide range of ion-exchange capacities can be produced. For example, when solution polymerization is adopted, the content of the low molecular weight compound (b) in the polymer composition tends to increase. Therefore, when the polymer composition of the present embodiment is produced by solution polymerization, cleaning is carried out preferably 3 times or more and more preferably 5 times or more with a combination of a good solvent/a poor solvent in the second cleaning step described later in order to sufficiently reduce the content of the low molecular weight compound (b).

Examples of the polymerization medium in the solution polymerization method include a hydrochlorofluorocarbon, a hydrofluorocarbon, a hydrofluoroether, a hydrocarbon, a chlorocarbon, and an alcohol.

Examples of the polymerization medium in the suspension polymerization method include one obtained by adding water to a medium including one or more of a hydrochlorofluorocarbon, a hydrofluorocarbon, a hydrofluoroether, a chlorocarbon, a hydrocarbon, and the like.

Examples of the polymerization medium in the emulsion polymerization method include water, and the same polymerization medium as the polymerization medium used in the solution polymerization method may be used in combination.

The polymerization pressure is preferably 0.05 MPaG (gauge pressure) or more. If the pressure is too low, it is difficult to maintain the rate of the polymerization reaction at a speed that can be practically satisfactory, and it is difficult to obtain a high molecular weight fluorine-containing copolymer. The polymerization pressure is preferably 2.0 MPaG or less, and, from the viewpoint of safety, is more preferably 0.7 MPaG or less.

The conditions and operations other than the polymerization pressure are not particularly limited, and a wide range of reaction conditions can be adopted. For example, the optimum value of the polymerization temperature can be selected depending on the type of the monomer, the reaction molar ratio, and the like, and the reaction at an extremely high or low temperature is disadvantageous for industrial practice, and thus 20 to 90° C. is preferable, and 30 to 80° C. is more preferable.

The polymerization may be started by irradiation with ionizing radiation, but it is more advantageous for industrial practice to use a polymerization initiator such as an azo compound or a peroxy compound exhibiting high activity at the preferable reaction temperature (20 to 90° C.) described above.

Examples of the polymerization initiator include a diacyl peroxide (disuccinic acid peroxide, benzoyl peroxide, perfluoro-benzoyl peroxide, lauroyl peroxide, bis(pentafluoropropionyl) peroxide, or the like), an azo compound (2,2'-azobis(2-amidinopropane) hydrochloride, 4,4'-azobis(4-cyanovaleric acid), dimethyl 2,2'-azobisisobutyrate, azobisisobutyronitrile, or the like), a peroxyester (t-butylperoxyisobutyrate, t-butylperoxypivalate, or the like), a peroxydicarbonate (diisopropylperoxydicarbonate, bis(2-ethylhexyl)peroxydicarbonate, or the like), a hydroperoxide (diisopropylbenzene hydroperoxide, t-butylhydroperoxide, or the like), a dialkyl peroxide (di-t-butyl peroxide, perfluoro-di-t-butyl peroxide), ammonium persulfate, sodium persulfate, and potassium persulfate.

The amount of the polymerization initiator added is preferably 0.0001 to 3 parts by mass, and more preferably 0.0001 to 2 parts by mass, per 100 parts by mass of the monomer. By reducing the amount of the polymerization initiator added, the molecular weight of the fluorine-containing copolymer can be increased. In addition to the polymerization initiator, a molecular weight modifier (chain transfer agent) or the like used in usual solution polymerization may be added.

Each monomer may be fed in a batch, or may be fed sequentially or continuously. From the viewpoint of making the composition of the fluorine-containing copolymer generated uniform by keeping the concentration of the monomer in the reaction system constant, for example, it is preferable to sequentially add a fluoroolefin and a perfluorovinyl compound having a carboxylic acid type functional group to the polymerization system including a hydrofluorocarbon as a polymerization medium to cause a continuous reaction.

The sequential addition may be carried out by changing the proportion of each monomer added between the initial stage of polymerization and the late stage of polymerization, or by keeping the concentration of each monomer in the polymerization system constant by supplementing each monomer consumed by the polymerization, and the latter is preferable from the viewpoint of making the composition of the fluorine-containing copolymer obtained uniform. Specifically, it is preferable to sequentially introduce a fluoroolefin such that the polymerization pressure becomes constant, and sequentially add a perfluorovinyl compound having an ionic functional group in proportion to the amount of the fluoroolefin introduced.

The form of the fluorine-containing copolymer used in the step of cleaning with a solvent may be a powder or a pellet. In addition, the fluorine-containing copolymer may be in a completely dried state or in a state of including a solvent. Use of a pellet provides excellent filterability, and use of a powder provides excellent cleanability. In the present embodiment, productivity (reduction in man-hours) and cleanability are emphasized, and thus the state of including a solvent is preferable.

In the production method of the present embodiment, it is preferable to carry out a two-step cleaning with an organic solvent without drying or further pelletizing, after the washing with water of the slurry after the completion of polymerization is completed. By doing so, there is the following tendency: the productivity is good, a decrease in yield can be suppressed, and bubbling, coloring, and the like at the time of heating and melting can be suppressed. That is, the production method of the present embodiment preferably includes a first cleaning step and a second cleaning step in the order presented.

(First Cleaning Step)

Examples of a first cleaning solvent that can be used for cleaning in the first cleaning step include a polar solvent having an affinity for water such as methanol, ethanol, 1-propanol, isopropanol, n-butanol, 2-butanol, t-butanol, acetone, acetonitrile, tetrahydrofuran, or dioxane. Among them, methanol is preferable. The main effects of the first cleaning with these solvents are as follows.

(i) Removal of a low molecular weight polar compound (bubbling substance) such as a hydrolyzed monomer or an emulsifier.
(ii) Suppression of hydrolysis by water displacement.
(iii) Enabling continuous cleaning with a fluorine-based solvent as a second cleaning solvent.

As a substance causing bubbling during membrane formation by heating, there is a low molecular weight polar compound such as a hydrolyzed monomer or an emulsifier, in addition to the low molecular weight compounds described above. These have low solubility in a fluorine-based solvent, and thus cleaning with a fluorine solvent alone is difficult. In addition, by removing these low molecular weight polar compounds in advance, the removal of the low molecular weight compound (a) is also promoted. In addition, by cleaning with a hydrophilic solvent such as methanol, the water in the polymer can be displaced, the hydrolysis of a side chain functional group in the cleaning step and the drying step can be reduced, and as a result, bubbling and coloring during membrane formation by heating can be suppressed. Cleaning of an oligomer from the polymer with a fluorine-based solvent can be easily carried out. After washing with water, cleaning with a fluorine-based solvent requires a step of drying the polymer once to remove water or further pelletizing it. However, carrying out methanol cleaning as the first cleaning enables continuous cleaning with a fluorine-based solvent, providing improved productivity due to the reduction in man-hours. If an attempt is made to clean the polymer directly with a fluorine-based solvent after washing the polymer with water, a phenomenon called creaming occurs and the entire system becomes creamy, making separation and purification difficult.

(Second Cleaning Step)

As the second cleaning solvent that can be used for cleaning in the second cleaning step, a mixed solvent of a good solvent and a poor solvent or only either one of a good solvent and a poor solvent can be used, and in consideration of the cleanability and the filterability, a mixed solvent that can control the swelling rate of the fluorine-containing copolymer to some extent is preferable. The swelling rate of the fluorine-containing copolymer in the second cleaning solvent is preferably 5 to 400%, and more preferably 10 to 100%. The swelling rate can be measured, for example, based on the following method. That is, the fluorine-containing copolymer is added to a 100 mL graduated cylinder so as to be 20 mL, and then the solvent is added to make 100 mL, the volume change of the fluorine-containing copolymer is visually measured, and the volume increase rate after swelling is defined as the swelling rate. For example, if the volume of the fluorine-containing copolymer increases to 25 mL after the addition of the solvent, the increase is 5 mL, and thus the swelling rate is calculated as (5 mL/20 mL)× 100=25%.

In the present embodiment, the good solvent refers to a solvent having a high affinity for the fluorine-containing copolymer, and for example, a solvent having an HSP value, which is a Hansen solubility parameter, close to that of the fluorine-containing copolymer may be selected. On the other hand, the poor solvent refers to a solvent having a low affinity for the fluorine-containing copolymer, and for example, a solvent having an HSP value far from that of the fluorine-containing copolymer may be selected.

The HSP value ($\delta$) refers to a physical property value defined by the square root of the cohesive energy density, and is a parameter developed into three components: the dispersion force term ($\delta_d$), the polarity term ($\delta_p$), and the hydrogen bond term ($\delta_h$) ($\delta^2 = \delta_d^2 + \delta_p^2 + \delta_h^2$).

Here, when the HSP value ($\delta_d$, $\delta_p$, $\delta_h$) is regarded as three-dimensional spatial coordinates, the closer the HSP value of the target substance and the HSP value of the solvent are to each other, the easier it is to dissolve the substance or the higher the affinity tends to be (see FIG. 1). As a guide, if the difference between the HSP value of the solute and the HSP value of the solvent (distance between vector end points) is 11 or more, the affinity of the solvent is low, and the solvent is positioned at a poor solvent from the viewpoint of the HSP value (see Table 1). The HSP value can be calculated by the Y-MB method in HSPiP calculation software (developed by Professor Hideki Yamamoto, Kansai University).

In the present embodiment, various fluorine-containing copolymers can be adopted as described above, and thus a good solvent and a poor solvent may be determined according to the fluorine-containing copolymer, and typical examples of the good solvent include, but are not limited to, a fluorine-based solvent such as $CClF_2CF_2CClFH$, $C_4F_9C_2H_5$, $C_6F_{13}CH_2CH_3$, $C_8F_{17}C_2H_5$, $C_6F_{13}H$, $HC_6F_{12}H$, $HC_4F_8H$, $C_6F_{14}$, $C_7F_{16}$, $CF_3CFHCFHCF_2CF_3$, $(CF_3)_2CFCFHCFHCF_3$, $C_6F_6$, $CH_3CCl_2F$, $CF_3CH_2OCF_2CF_2H$, $C_4F_9OCH_3$, $C_4F_9OC_2H_5$, $CF_3CF_2CF_2OCH_3$, $(CF_3)_2CFOCH_3$, $CHF_2CH_2CF_3$, $CF_3CH_2CF_2CH_3$, $F_3C-C(F)=CH_2$ and $CF_3CH_2OH$, and $CF_3CFHCFHCF_2CF_3$, $C_4F_9OC_2H_5$, and $CF_3CH_2OH$ are preferable. In addition to the above, examples of a good solvent that can be adopted include, but are not limited to, trimethyl orthoformate, triethyl orthoacetate, 1,2-dimethoxyethane, isopropyl acetate, dimethyl sulfite, and trimethyl borate.

Typical examples of the poor solvent include, but are not limited to, methanol, ethanol, 1-propanol, isopropanol, n-butanol, 2-butanol, t-butanol, acetone, acetonitrile, cyclopentane, n-hexane, cyclohexane, heptane, and isooctane, and methanol is preferable.

Hereinafter, a method for determining a good solvent and a poor solvent for a fluorine-containing copolymer will be described with reference to specific examples.

For example, the HSP value of a fluorine-containing copolymer (Sn=0 polymer) obtained by copolymerizing $CF_2=CFOCF_2CF_2SO_2F$ and TFE at a molar ratio of 1:4.3 is calculated as $\delta_d$=14.0, $\delta_p$=12.2, and $\delta_h$=5.8 using the HSPiP calculation software (Y-MB method).

In addition, the HSP value of a fluorine-containing copolymer (Sn=1 polymer) obtained by copolymerizing $CF_2=CFOCF_2CF(CF_3)OCF_2CF_2SO_2F$ and TFE at a molar ratio of 1:5 is calculated as $\delta_d$=12.6, $\delta_p$=9.8, and $\delta_h$=4.1 in the same manner as above.

Subsequently, among the poor solvents described above, methanol, ethanol, 1-propanol, 1-butanol, n-hexane, cyclohexane, and heptane were each selected, among the good solvents described above, trimethyl orthoformate, isopropyl acetate, dimethyl sulfite, and trimethyl borate were each selected, and the results of calculating the HSP values in the same manner as above are shown in Table 1.

The respective differences in HSP value (spatial distances $\Delta n$=0 and $\Delta n$=1) of each solvent for Sn=0 polymer and Sn=1 polymer are as shown in Table 1, the spatial distances of each of the poor solvents are 11 or more, and it can be seen that each poor solvent has a low affinity for the polymers and can function as a poor solvent.

TABLE 1

| | $\delta_d$ | $\delta_p$ | $\delta_h$ | $\delta$Tot | Spatial distance $\delta n = 0$ | Spatial distance $\delta n = 1$ |
|---|---|---|---|---|---|---|
| Example of poor solvent | | | | | | |
| Methanol | 14.7 | 12.3 | 22.3 | 29.4 | 16.5 | 18.5 |
| Ethanol | 15.8 | 8.8 | 19.4 | 26.5 | 14.1 | 15.7 |
| 1-Propanol | 16.0 | 6.8 | 17.4 | 24.6 | 13.0 | 14.1 |
| 1-Butanol | 16.0 | 5.7 | 15.8 | 23.2 | 12.1 | 12.9 |
| n-Hexane | 14.9 | 0 | 0 | 14.9 | 13.5 | 10.9 |
| Cyclohexane | 16.8 | 0 | 0.2 | 16.8 | 13.7 | 11.4 |
| Heptane | 15.3 | 0 | 0 | 15.3 | 13.6 | 11.0 |
| Example of good solvent | | | | | | |
| Trimethyl orthoformate | 15.5 | 6.5 | 5.4 | 17.7 | 5.9 | 4.6 |
| Isopropyl acetate | 14.9 | 4.5 | 8.2 | 17.6 | 8.1 | 7.1 |
| Dimethyl sulfite | 17.6 | 9.9 | 5.6 | 20.9 | 4.2 | 5.2 |
| Trimethyl borate | 15.0 | 3.5 | 5.4 | 16.3 | 8.8 | 6.9 |
| Reference | | | | | | |
| Sn = 0 Polymer (EW710) | 14.0 | 12.2 | 5.8 | 19.5 | | |
| Sn = 1 Polymer (EW950) | 12.6 | 9.8 | 4.1 | 16.5 | | |

Methanol is a poor solvent (low affinity) for the polymers, but the low molecular weight compound (a) (oligomer having a —COOX group as an ionic group at an end of the main chain) is more soluble in a mixed solvent of methanol/a fluorine-based solvent wherein methanol is a polar solvent than in a fluorine-based solvent alone, and is cleaned and extracted more efficiently. Further, in the step of evaporating the solvent to dryness from the polymer after cleaning, the presence of methanol results in a stable structure in which —COOX (carboxyl group) at an end of the polymer main chain is partially esterified, and thus the effect of suppressing bubbling due to decarboxylation decomposition at the time of heating at the end of the main chain during melt molding is also obtained.

As a cleaning solvent which may be a good solvent, many fluorine-based solvents can be used. Examples of the fluorine-based solvent include a hydrochlorofluorocarbon, a hydrofluorocarbon, a perfluorocarbon, a perfluoroether, and a hydrofluoroether. A hydrochlorofluorocarbon, a hydrofluorocarbon, and a hydrofluoroether are preferable, and a hydrofluorocarbon and a hydrofluoroether, which have no ozone depletion potential, are more preferable. Only a fluorine-based solvent may be used alone, two or more fluorine-based solvents may be mixed and used, or a fluorine-based solvent and a further solvent may be mixed and used. A good solvent/poor solvent combination is preferably used.

The amount of the cleaning solvent is preferably 1 to 100 times, and more preferably 3 to 50 times the mass of the fluorine-containing copolymer. If the amount of the cleaning solvent is small, the cleaning cannot be carried out sufficiently, and if the amount of the cleaning solvent is large, the treatment after cleaning takes time and a large cleaning facility is required, which lower the productivity.

In addition, the number of cleanings is related to the amount of the cleaning solvent; and if the amount of the cleaning solvent is large, the number of cleanings may be small, and if the amount of the cleaning solvent is small, the number of cleanings is large. If the number of cleanings is one, a solvent including a low molecular weight component such as an oligomer remains in the swollen polymer, resulting in insufficient cleaning. The number of cleanings is preferably 3 times or more, and more preferably 5 times or more.

The cleaning temperature is preferably room temperature to 150° C. If the cleaning temperature is too low, the amount of the low molecular weight component extracted is small, and if the cleaning temperature exceeds 150° C., the decomposition of the fluorine-containing copolymer starts. In addition, too much heating may cause hydrolysis of the side chain functional group due to the remaining water to proceed, and thus the temperature is preferably equal to or less than the boiling point of the solvent.

The cleaning time is preferably 5 minutes to 12 hours, and more preferably 20 minutes to 6 hours. The higher the cleaning temperature, the shorter the cleaning time.

The separation treatment after cleaning may be carried out at the same heating temperature as during the cleaning described above, or may be carried out after cooling. In addition, filtration may be carried out directly after cleaning, or filtration may be carried out after a poor solvent is added to cause precipitation. Instead of filtration, other methods such as centrifugation may be used.

The total amount of the low molecular weight compound (a) and the low molecular weight compound (b) removed by cleaning is preferably 10% by mass or less per 100% by mass of the fluorine-containing copolymer before cleaning. If the amount of the low molecular weight component removed exceeds 10% by mass, the yield of the expensive fluorine-containing copolymer decreases, which tends to be economically disadvantageous.

<Ion-Exchange Membrane>

The ion-exchange membrane of the present embodiment can be obtained from the polymer composition of the present embodiment. That is, the ion-exchange membrane of the present embodiment includes the polymer composition of the present embodiment. Examples of the method for producing an ion-exchange membrane include one having a step of forming a membrane of a fluorine-containing copolymer as a polymer composition, and a step of converting a sulfonic acid type functional group or a carboxylic acid type functional group of the fluorine-containing copolymer into a sulfonic acid or a carboxylic acid by hydrolysis. Either the membrane formation step or the conversion step may be carried out first, and the conversion step is preferably carried out after the membrane formation step.

The ion-exchange membrane of the present embodiment may be a laminate having a plurality of layers including the polymer composition of the present embodiment and having different ion-exchange capacities of the fluorine-containing copolymer in the layers; may be a laminate having a layer including the polymer composition of the present embodiment and a layer including a fluorine-containing copolymer having a carboxylic acid type functional group; or may be a laminate having a reinforcing material.

Examples of the reinforcing material include a woven fabric (cloth), a fiber, and a non-woven fabric.

The ion-exchange membrane of the present embodiment includes the polymer composition of the present embodiment, and thus bubbling and coloring during melt molding are suppressed, and peeling resistance is improved.

EXAMPLES

Hereinafter, the present embodiment will be described in detail with reference to Examples and Comparative Examples, but the present embodiment is not limited thereby at all.

(Method for Quantifying Low Molecular Weight Compound (a))

Mixed solvent A in which methanol and $CF_3CHFCHFCF_2CF_3$ (hereinafter, also referred to as "solvent A") were mixed such that the volume ratio was methanol/$CF_3CHFCHFCF_2CF_3$=2/1 was added to a polymer composition (mass: W1) in an amount of 5 times the mass thereof, and the resulting mixture was refluxed at 50° C. for 1 hour. The filtrate collected by suction filtration was concentrated under reduced pressure using an evaporator and subjected to vacuum drying to obtain a dry solid, and the low molecular weight compound (a) extracted was quantified from the mass (W2) of the dry solid based on the following expression.

$$\text{Content of low molecular weight compound } (a) \text{ (ppm)} = W2/W1$$

(Method for Quantifying Low Molecular Weight Compound (b))

The low molecular weight compound (b) was quantified by the same operation as for the quantification of the low molecular weight compound (a) except that the mixed solvent was changed to a mixed solvent of hexane and solvent A (volume ratio: 1/1).

(Measurement of Molecular Weight of Low Molecular Weight Compound (a) by Gel Permeation Chromatography (Hereinafter, also Referred to as "GPC"))

The dry solid obtained by the above (Method for quantifying low molecular weight compound (a)) was dissolved in a mixed solvent of methanol/solvent A (1/1 (volume ratio)), and GPC analysis was carried out using the following GPC apparatus. A standard sample, polymethyl methacrylate, was used for molecular weight conversion. From the obtained analysis results, the number average molecular weight of the low molecular weight compound (a) was determined.

GPC main apparatus: HLC-8320GPC manufactured by Tosoh Corporation

Detector: ELSD-LT II manufactured by Shimazu Corporation (GPC analysis conditions)

Injection volume: 100 μL

Measurement time: 30 min

Flow rate: 1 mL/min

Measurement temperature: Normal temperature

Eluent: Methanol/solvent A (1/1 (volume ratio))

2×Sample column α-M, guard column (manufactured by Tosoh Corporation)

2×Reference column H-RC (manufactured by Tosoh Corporation)

D. tube temperature: 35° C.

(Evaluation of Bubbling Property of Ion-Exchange Membrane)

The polymer composition obtained in each of the examples described below was allowed to stand (preheated) at 270° C. and 3 MPa for 4 minutes and heat-pressed at 13 MPa for 1 minute to prepare an ion-exchange membrane having a thickness of about 1 mm. The ion-exchange membrane was visually observed and evaluated according to the following criteria.

◯: There was no bubbling (the number of bubbles was 0).
Δ: Bubbling was slightly found (the number of bubbles was less than 10).
×: Bubbling was greatly found (the number of bubbles was 10 or more).

(Evaluation of Peelability of Ion-Exchange Membrane)

The peeling resistance of the ion-exchange membranes in Examples and Comparative Examples described later was evaluated as follows.

The peeling resistance was evaluated by observing the ion-exchange membrane after electrolysis and measuring the area ratio of a portion where the peeling between layers occurred.

First, as the electrolyzer used for electrolysis, one that had a structure in which an ion-exchange membrane was disposed between the positive electrode and the negative electrode and wherein four electrolytic cells of a type forcibly circulating the electrolyte solution (forced circulation type) were arranged in series was used.

The distance between the positive electrode and the negative electrode in the electrolytic cell was 1.5 mm.

As the negative electrode, an electrode in which nickel oxide was applied as a catalyst to an expanded metal of nickel was used.

As the positive electrode, an electrode in which ruthenium, iridium, and titanium were applied as catalysts to an expanded metal of titanium was used.

Salt water was supplied to the positive electrode side in such a way as to maintain a concentration of 23 g/L, and caustic soda having a concentration of 25% by mass was supplied to the negative electrode side.

During the electrolysis, water was not supplied to the negative electrode side.

Electrolysis was carried out for 40 hours under conditions of the temperature of the salt water set to 90° C., a current density of 4 kA/m$^2$, and the hydraulic pressure on the negative electrode side of the electrolyzer 5.3 kPa higher than the hydraulic pressure on the positive electrode side.

When the area of the conducting portion of the ion-exchange membrane after electrolysis was x (cm$^2$) and the area of the portion where the peeling occurred was y (cm$^2$), the area ratio A of the peeled portion represented by the following expression was calculated.

$$A = y/x \times 100 (\%)$$

The area y was measured using image analysis software (UM02-SUZ-01 manufactured by SCALAR CORPORATION).

The peeling resistance evaluation was defined as ◯ when the area ratio A of the peeled portion was less than 5%, Δ when the area ratio A was 5% to 25%, and × when the area ratio A was 25% or more.

The ion-exchange membrane (laminated membrane) for the evaluation described above was prepared as follows.

First, the following monomers A to C were provided as raw material monomers.

Monomer A: TFE
Monomer B: $CF_2=CFOCF_2CF(CF_3)OCF_2CF_2CO_2CH_3$
Monomer C: $CF_2=CFOCF_2CF(CF_3)OCF_2CF_2SO_2F$ Subsequently, as a raw material for the first layer (polymer composition for the first layer), monomer A and monomer B were copolymerized at a ratio of 11:1 to prepare a polymer composition including a fluorine-containing copolymer (fluorine-containing copolymer having a carboxylic acid type functional group).

In addition, as a raw material for the second layer (polymer composition for the second layer), a mixture of a fluorine-containing copolymer (fluorine-containing copolymer having a carboxylic acid type functional group) obtained by copolymerizing monomer A and monomer B at a mass ratio of 6.5:1 and a fluorine-containing copolymer (fluorine-containing copolymer having a sulfonic acid type functional group) obtained by copolymerizing monomer A and monomer C at a mass ratio of 5.8:1 was prepared.

Further, as a raw material for the third layer (polymer composition for the third layer), the polymer compositions obtained in Examples 1 to 6 and Comparative Examples 1 and 2 were used.

Co-extrusion was carried out using the polymer composition for the first layer and the polymer composition for the second layer using an apparatus equipped with two extruders, a T-die for co-extrusion for two layers, and a take-up machine to obtain two-layer film (a) having a thickness of 70 μm. As a result of observing a cross section of the film, the thickness of the first layer was 16.5 μm and the thickness of the second layer was 53.5 μm.

Further, using the polymer composition for the third layer and using a single layer T die, single layer (third layer) film (b) having a thickness of 50 μm was obtained.

In addition, a reinforcement yarn obtained by twisting a 100-denier tape yarn made of polytetrafluoroethylene (PTFE) at 900 times/m into a yarn shape, 30-denier, 6-filament polyethylene terephthalate (PET) yarn twisted at 200 times/m as the warp of a sacrifice yarn, and a 35-denier, 8-filament PET yarn twisted at 10 times/m as the weft were provided, and these yarns were plain woven in an alternating arrangement such that the number of the PTFE yarns was 24 yarns/inch and the number of the sacrifice yarns was 64 yarns/inch, which was four times that of PTFE, to obtain a woven fabric having a thickness of 100 μm as a reinforcing material. The obtained woven fabric was pressure bonded using a heated metal roll to adjust the thickness of the woven fabric to 70 μm. At this time, the aperture ratio of only the PTFE yarn was 75%.

A breathable heat-resistant release paper, film (b), the woven fabric, and film (a) such that the second layer faced the woven fabric side were laminated sequentially on a drum having a heating source and a vacuum source inside and having a large number of micropores on the surface and integrated at a temperature of 230° C. and a reduced pressure of −650 mmHg while removing the air between the materials, to obtain a laminated membrane.

This composite membrane was hydrolyzed in an aqueous solution containing 5.0% by mass of dimethyl sulfoxide (DMSO) and 6.5 normal (N) KOH at a temperature of 95° C. for 30 minutes, and then equilibrium treatment was carried out using a 0.5 normal (N) NaOH solution under a condition of 90° C. After washing with water, equilibrium treatment was carried out in a 0.1 N caustic soda aqueous solution at a temperature of 90° C.

A polymer composition having a sulfonic acid group obtained by hydrolyzing a copolymer of $CF_2=CF_2$ and $CF_2=CFOCF_2CF(CF_3)O(CF_2)_2SO_2F$ having an equal weight of 910 was dissolved in an amount of 10% by mass in a mixed solution of 50/50 parts by mass of water and ethanol. 40% by mass of zirconium oxide having a primary particle size of 0.02 μm was added to the resulting solution, and uniformly dispersed using a ball mill to obtain a suspension. This suspension was applied to both sides of the membrane after the equilibrium treatment by a spray method and dried to form a coating layer, and an ion-exchange membrane for the evaluation described above was obtained.

(Evaluation of Coloring (YI))

Using the ion-exchange membrane having a thickness of about 1 mm prepared above, the yellow index (YI) was measured a total of three times using a colorimetric color difference meter ZE6000 (manufactured by Nippon Denshoku Industries Co., Ltd.), and the average value was used as the YI value. Based on the obtained YI value, the coloring was evaluated according to the following criteria.

◯: The YI value was 5 or less
Δ: The YI value was more than 5 and less than 9
×: The YI value was 9 or more (Electrolysis Performance Evaluation)

Electrolysis was carried out under the following conditions, and the electrolysis performance was evaluated by a power consumption PC (kWh) required to prepare 1 t of NaOH based on the electrolysis voltage and the current efficiency. The value of the power consumption PC was calculated using the following expression.

$$PC = 670 \times (\text{electrolysis voltage/current efficiency})$$

◎: PC was 2050 kWh or less
◯: PC was more than 2050 kWh and less than 2100 kWh
Δ: PC was 2100 kWh or more

[Measurement of Electrolysis Voltage]

As the electrolyzer used for electrolysis, one that had a structure in which an ion-exchange membrane was disposed between the positive electrode and the negative electrode and wherein four zero-gap electrolytic cells of natural circulation type were arranged in series was used. As the negative electrode, a woven mesh obtained by weaving fine nickel wires having a diameter of 0.15 mm coated with cerium oxide and ruthenium oxide as catalysts with openings of 50 mesh was used. In order to bring the negative electrode and the ion-exchange membrane into close contact with each other, a mat obtained by weaving fine nickel wires was disposed between the current collector made of an expanded metal made of nickel and the negative electrode. As the positive electrode, an expanded metal made of titanium coated with ruthenium oxide, iridium oxide, and titanium oxide as catalysts was used. Using the electrolyzer described above, salt water was supplied to the positive electrode side while adjusting the concentration to 205 g/L, and water was supplied while keeping the caustic soda concentration on the negative electrode side at 32% by mass. Electrolysis was carried out under conditions of the temperature of the electrolyzer set to 85° C., a current density of 6 kA/m², and the hydraulic pressure on the negative electrode side of the electrolyzer 5.3 kPa higher than the hydraulic pressure on the positive electrode side. The pair voltage between the positive and negative electrodes of the electrolyzer was measured daily using a voltmeter TR-V1000 manufactured by KEYENCE Corporation, and the average value for 7 days was determined as the electrolysis voltage.

[Measurement of Current Efficiency]

The current efficiency was determined by measuring the mass and the concentration of caustic soda generated and dividing the number of moles of caustic soda generated in a certain period of time by the number of moles of electrons of the current flowing during that period.

Example 1

(Step I: Preparation Step of Pre-Emulsion)

9.6 kg of water, 2.4 kg of $CF_2=CFOCF_2CF_2SO_2F$ as a perfluorovinyl compound, 4.25 g of an 85% phosphoric acid aqueous solution, 40.7 g of sodium dihydrogen phosphate, and 28.8 g of $CF_3CF_2CF_2OCF(CF_3)CF_2OCF(CF_3)COONH_4$ were mixed, and an emulsion was prepared using a homogenizer.

(Step II: Polymerization Step)

2.5 kg of water, 1.16 g of an 85% phosphoric acid aqueous solution, 11.1 g of sodium dihydrogen phosphate, and 31.6 g of $CF_3CF_2CF_2OCF(CF_3)CF_2OCF(CF_3)COONH_4$ were fed into a stainless steel reactor (autoclave) having an internal volume of 22 L (liters), the inside of the reactor was sufficiently purged with nitrogen and purged with TFE, and then the temperature was raised until the internal temperature of the reactor reached 50° C. Subsequently, 863 g of the pre-emulsion and 200 g of an ammonium persulfate aqueous solution (4.2% by mass) as an initiator were fed, and TFE was fed until the internal pressure of the reactor reached 0.5 MPaG, to start polymerization. During the polymerization reaction, TFE was continuously added so that the pressure was kept at 0.5 MPaG. When the amount of TFE introduced from the start of the reaction reached 36 g, 200 g of an ammonium persulfate aqueous solution (8.4% by mass) was fed, and continuous addition of the pre-emulsion (28.6 g/min) was started. When the amount of pre-emulsion introduced from the start of the reaction reached 11.0 kg, the introduction of the pre-emulsion was stopped, the reactor was cooled to 25° C., and then unreacted TFE was released to the outside of the system to finish the polymerization.

(Step III: Salting-Out Step)

1.59 kg of the polymerization liquid obtained above was diluted with 1.59 kg of distilled water, and this was heated to 35° C. with stirring. 1.35 kg of 1.41 M aqueous ammonium sulfate was added dropwise to this solution over 1 hour, and after completion of the addition, the resulting mixture was stirred at 35° C. for 2 hours to obtain a salting-out slurry.

This salting-out slurry was filtered, distilled water was added in 3 times the amount in terms of the polymer, and the resulting mixture was stirred at room temperature for 10 minutes and subjected to $N_2$ pressure filtration (0.2 MPaG). This operation was repeated 7 times.

(Step IV: First Solvent Cleaning Step)

Thereafter, methanol was added in an amount of 3 times the weight of the polymer, and the resulting mixture was stirred at room temperature for 20 minutes and then subjected to $N_2$ pressure filtration (0.2 MPaG). This methanol cleaning was repeated (10 times in total).

(Step V: Second Solvent Cleaning Step)

Thereafter, methanol/solvent A (2/1 (volume ratio)) was added in an amount of 3 times the weight of the polymer, and the resulting mixture was stirred at room temperature for 30 minutes. Thereafter, the mixture was subjected to $N_2$ pressure filtration (0.2 MPaG). This operation was repeated (10 times in total).

(Step (VI): Drying Step)

After step V, the obtained wet polymer was roughly dried by $N_2$ blow, and further subjected to heating and vacuum drying (100° C., 0.1 kPa, 5 hours) in a tray dryer to collect a dried polymer (polymer composition).

The obtained dried polymer was subjected to the quantification and measurement described above. Further, the ion-exchange membrane obtained from the dried polymer was evaluated as described above. Results are shown in Table 2.

Example 2

A dried polymer was obtained by the same operation as in Example 1 except that in step (V), the number of cleanings was one.

The obtained dried polymer was subjected to the quantification and measurement described above. Further, the ion-exchange membrane obtained from the dried polymer was evaluated as described above. Results are shown in Table 2.

Example 3

A dried polymer was obtained by the same operation as in Example 1 except that in step (V), trifluoroethanol (hereinafter, also referred to as "solvent B") was used instead of solvent A.

The obtained dried polymer was subjected to the quantification and measurement described above. Further, the ion-exchange membrane obtained from the dried polymer was evaluated as described above. Results are shown in Table 2.

Example 4

A dried polymer was obtained by the same operation as in Example 1 except that in step (V), methanol/solvent A (2/1 (volume ratio)) was changed to methanol/$C_4F_9OC_2H_5$ (hereinafter, also referred to as "solvent C") (4/1 (volume ratio)).

The obtained dried polymer was subjected to the quantification and measurement described above. Further, the ion-exchange membrane obtained from the dried polymer was evaluated as described above. Results are shown in Table 2.

Example 5

A dried polymer was obtained by the same operation as in Example 1 except that in step (V), n-hexane was used instead of methanol.

The obtained dried polymer was subjected to the quantification and measurement described above. Further, the ion-exchange membrane obtained from the dried polymer was evaluated as described above. Results are shown in Table 2.

Example 6

A dried polymer was obtained by the same operation as in Example 1 except that step (IV) was not carried out.

The obtained dried polymer was subjected to the quantification and measurement described above. Further, the ion-exchange membrane obtained from the dried polymer was evaluated as described above. Results are shown in Table 2.

Comparative Example 1

A dried polymer was obtained by the same operation as in Example 1 except that step (V) was not carried out.

The obtained dried polymer was subjected to the quantification and measurement described above. Further, the ion-exchange membrane obtained from the dried polymer was evaluated as described above. Results are shown in Table 2.

Comparative Example 2

A dried polymer was obtained by the same operation as in Example 1 except that in Example 1, the step (IV) was not carried out, methanol/solvent A (2/1 (volume ratio)) in step (V) was changed to solvent A only, and the number of cleanings/filtrations was reduced to three times.

The obtained dried polymer was subjected to the quantification and measurement described above. Further, the ion-exchange membrane obtained from the dried polymer was evaluated as described above. Results are shown in Table 2.

Comparative Example 3

A dried polymer was obtained by the same operation as in Example 1 except that in Example 1, neither of steps (IV) and (V) was carried out, and in step (VI), the polymer was not roughly dried by $N_2$ blow and was subjected to heating and vacuum drying in a tray dryer.

The obtained dried polymer was subjected to the quantification and measurement described above. Further, the ion-exchange membrane obtained from the dried polymer was evaluated as described above. Results are shown in Table 2.

TABLE 2

| | Production conditions | | | | Evaluation | | | | | | |
|---|---|---|---|---|---|---|---|---|---|---|---|
| | First cleaning Cleaning solvent | Number of first cleanings | Second cleaning Cleaning solvents (volume ratio) | Number of second cleanings | Content of low molecular weight compound (a) (ppm) | Content of low molecular weight compound (b) (ppm) | Number average molecular weight of low molecular weight compound (a) | Bubbling property | Peelability | Coloring (YI) | PC |
| Example 1 | Methanol | 10 | Methanol/ solvent A (2/1) | 10 | 200 | 10 | 1700 | ○ | ○ | ○ | ◎ |
| Example 2 | Methanol | 10 | Methanol/ solvent A (2/1) | 1 | 540 | 22 | 2500 | Δ | ○ | Δ | ○ |

TABLE 2-continued

| | Production conditions | | | | Evaluation | | | | | |
|---|---|---|---|---|---|---|---|---|---|---|
| | First cleaning Cleaning solvent | Number of first cleanings | Second cleaning Cleaning solvents (volume ratio) | Number of second cleanings | Content of low molecular weight compound (a) (ppm) | Content of low molecular weight compound (b) (ppm) | Number average molecular weight of low molecular weight compound (a) | Bubbling property | Peelability | Coloring (YI) | PC |
| Example 3 | Methanol | 10 | Methanol/ solvent B (2/1) | 10 | 260 | 19 | 2200 | ○ | ○ | ○ | ◎ |
| Example 4 | Methanol | 10 | Methanol/ solvent C (4/1) | 10 | 250 | 24 | 1900 | ○ | ○ | ○ | ◎ |
| Example 5 | Methanol | 10 | Hexane/ solvent A (2/1) | 10 | 350 | 13 | 1600 | ○ | ○ | Δ | ◎ |
| Example 6 | None | None | Methanol/ solvent A (2/1) | 10 | 470 | 15 | 1800 | Δ | ○ | Δ | ◎ |
| Comparative Example 1 | Methanol | 10 | None | None | 1300 | 22 | 3400 | X | ○ | X | ○ |
| Comparative Example 2 | None | None | Solvent A only | 3 | 870 | 47 | 2500 | X | Δ | X | Δ |
| Comparative Example 3 | None | None | None | None | 4000 | 90 | 4500 | X | X | X | Δ |

The results of calculating the HSP values of solvents A to C using the HSPiP calculation software (Y-MB method) were as follows.

$\delta_d=12.3, \delta_p=1.4, \delta_h=1.1$ — Solvent A:

$\delta_d=14.9, \delta_p=7.8, \delta_h=14.0$ — Solvent B:

$\delta_d=13.1, \delta_p=2.8, \delta_h=2.1$ — Solvent C:

INDUSTRIAL APPLICABILITY

The polymer composition according to the present invention can be suitably used in the field of salt electrolysis.

The invention claimed is:

1. A polymer composition comprising:
   a fluorine-containing copolymer comprising a unit (a) derived from a perfluorovinyl compound having a side chain having an ionic group and a unit (b) derived from a fluoroolefin; and
   a low molecular weight compound (a) having a functional group represented by —COOX, wherein X is H, NH$_4$, or a monovalent metal ion,
   wherein a content of the low molecular weight compound (a) is 600 ppm or less based on a mass of the polymer composition.

2. The polymer composition according to claim 1, wherein the polymer composition further comprises a low molecular weight compound (b) that does not have a functional group represented by —COOX, wherein X is H, NH$_4$, or a monovalent metal ion,
   wherein a content of the low molecular weight compound (b) is 50 ppm or less based on the mass of the polymer composition.

3. The polymer composition according to claim 1, wherein the content of the low molecular weight compound (a) is 20 to 300 ppm.

4. The polymer composition according to claim 1, wherein a number average molecular weight of the low molecular weight compound (a) is 300 to 4000.

5. The polymer composition according to claim 1, wherein the perfluorovinyl compound is represented by the following formula (I):

$$CF_2=CF-(OCF_2CYF)_a-O-(CF_2)_b-SO_2M \quad (I)$$

wherein a represents an integer of 0 to 2, b represents an integer of 1 to 4, Y represents —F or —CF$_3$, and M represents —F or —Cl.

6. A method for producing the polymer composition according to claim 1, comprising a step of emulsion-polymerizing the fluoroolefin and the perfluorovinyl compound to obtain the fluorine-containing copolymer.

7. An ion-exchange membrane comprising the polymer composition according to claim 1.

* * * * *